United States Patent
Song et al.

(10) Patent No.: US 12,518,082 B2
(45) Date of Patent: Jan. 6, 2026

(54) METHOD AND SYSTEM FOR RECOMMENDING BOOKMARK OF WEBSITE

(71) Applicant: PIKURATE, LTD., Seoul (KR)

(72) Inventors: Seokkue Song, Seoul (KR); Minjoo Kim, Seoul (KR); Jaegoo Jho, Seoul (KR)

(73) Assignee: PIKURATE, LTD., Seoul (KR)

( * ) Notice: Subject to any disclaimer, the term of this patent is extended or adjusted under 35 U.S.C. 154(b) by 690 days.

(21) Appl. No.: 17/976,782

(22) Filed: Oct. 29, 2022

(65) Prior Publication Data

US 2023/0134441 A1 May 4, 2023

(30) Foreign Application Priority Data

Oct. 29, 2021 (KR) .......................... 10-2021-0146651

(51) Int. Cl.
*G06F 40/134* (2020.01)
*G06F 40/194* (2020.01)

(52) U.S. Cl.
CPC .......... *G06F 40/134* (2020.01); *G06F 40/194* (2020.01)

(58) Field of Classification Search
None
See application file for complete search history.

(56) References Cited

U.S. PATENT DOCUMENTS

| | | | | |
|---|---|---|---|---|
| 8,117,205 | B2* | 2/2012 | Rychener | G06F 16/9562 707/739 |
| 8,244,753 | B2* | 8/2012 | Rojer | G06F 16/9535 707/769 |
| 12,056,200 | B2* | 8/2024 | Chandrashekar | G06F 16/9562 |
| 2005/0262052 | A1* | 11/2005 | Daniels | G06F 16/9538 |
| 2007/0043745 | A1* | 2/2007 | Rojer | G06F 16/9562 |
| 2007/0250468 | A1* | 10/2007 | Pieper | G06F 16/9535 |
| 2010/0010981 | A1* | 1/2010 | Rychener | G06F 16/9562 707/E17.108 |

(Continued)

OTHER PUBLICATIONS

Eda Baykan et al. A Comprehensive Study of Features and Algorithms for URL-Based Topic Classification, Jul. 2011, ACM transaction son the web, vol. 5, No. 3, Article 15, pp. 1-29 (Year: 2011).*

*Primary Examiner* — Howard Cortes
(74) *Attorney, Agent, or Firm* — United One Law Group LLC; Kongsik Kim; Jhongwoo Peck

(57) ABSTRACT

A method for recommending bookmark data includes receiving a bookmark data set from a user terminal of a user, the bookmark data set including a main topic and a plurality of sub-topics, each of which includes a sub-title and a plurality of URLs; assigning a bookmark eigenvalue for the bookmark data set; and determining and transmitting another bookmark data set similar to the bookmark data set or another sub-topic similar to a sub-topic included in the bookmark data set to the user. The recommendation is made based on the bookmark eigenvalue, which is determined by assigning a URL eigenvalue for each URL included in each sub-topic by analyzing a web page that corresponds to the URL; assigning a sub-title eigenvalue for the sub-title of each sub-topic; and assigning a sub-topic eigenvalue in consideration of the URL eigenvalue and the sub-title eigenvalue.

8 Claims, 7 Drawing Sheets

(56) References Cited

U.S. PATENT DOCUMENTS

2015/0220497 A1* 8/2015 Kutilek ................ G06F 3/0482
  715/208
2017/0131862 A1* 5/2017 Hartmann ............. G06F 16/319
2023/0047383 A1* 2/2023 Yushkina ............ G06F 16/9535

* cited by examiner

METHOD AND SYSTEM FOR RECOMMENDING BOOKMARK OF WEBSITE

CROSS-REFERENCE TO RELATED APPLICATION(S)

The present application claims priority from Korean Application No. 10-2021-0146651 filed on Oct. 29, 2021, which is incorporated herein by reference in its entirety.

TECHNICAL FIELD

The present disclosure is directed to a method and a system for recommending website bookmarks, which have been created, to users who wants to configure the website bookmark.

RELATED ART

Users of the Internet make great efforts to obtain useful information using numerous contents uploaded to numerous websites that can be accessed through the Internet.

In particular, many Internet users utilize the bookmark function to organize useful information about a particular topic and to view the searched contents later more easily. Using the bookmark function, Internet users store access information (e.g., URL information) for audio contents, video contents, and text contents that are useful to them, and access the contents more easily later.

However, the information accessible through the Internet is so vast that Internet users spend a considerable amount of time searching for useful information on a specific field of interest and bookmarking the information to access this information.

In order to solve this problem, there may be a method of suggesting well-made bookmarks for an Internet user who is collecting information on a specific field through the Internet.

In fact, platform services that provide audio and video contents, such as Google's YouTube®, have a function of analyzing the particular user's content consumption pattern and recommending appropriate audio or video contents to the user. It also recommends 'playlists' already created by other users.

However, a service for recommending bookmarks to users for web pages (or websites) having text information as the main content has not yet been commercialized.

SUMMARY

Accordingly, a method for recommending well-made bookmarks to a user and a system therefor will be presented through various embodiments of the present disclosure.

The problem to be solved by the present disclosure is to provide a method for recommending well-made bookmarks to the users. The problem to be solved by the present disclosure is also to provide a system capable of recommending well-made bookmarks to the users.

According to some embodiments of the present disclosure, a method for recommending bookmark data may include a step of receiving a bookmark data set from a user, the bookmark data set including a main topic and a plurality of sub-topics, each of which includes a sub-title and a plurality of URLs. The method may further include assigning a bookmark eigenvalue for the bookmark data set based on a predetermined method. In particular, the predetermined method for assigning the bookmark eigenvalue may include assigning a URL eigenvalue for each of the plurality of URLs included in each of the plurality of sub-topics by analyzing a plurality of web pages that correspond to the plurality of URLs, assigning a sub-title eigenvalue for the sub-title of each the plurality of sub-topics, and assigning a sub-topic eigenvalue in consideration of the URL eigenvalue and the sub-title eigenvalue. The method may further include determining, based on the bookmark eigenvalue, another bookmark data set that is similar to the bookmark data set generated by the user or another sub-topic that is similar to a sub-topic included in the bookmark data set generated by the user, and transmitting the determined another bookmark data set or another sub-topic to the user terminal.

In some embodiments, an eigenvalue may be assigned for a user memo that corresponds to at least one of the plurality of sub-topics, and the sub-topic eigenvalue may be determined by further considering the eigenvalue for the user memo in addition to the URL eigenvalue and the sub-title eigenvalue. In some embodiments, the sub-topic eigenvalue may be determined by imparting a higher weight to the eigenvalue for the user memo than the URL eigenvalue and the sub-title eigenvalue.

The step of determining the another bookmark data set or the another sub-topic may include assigning an eigenvalue to each of bookmark data generated automatically or by another user other than the user, and selecting at least a part of the bookmark data generated automatically or by another user, which exhibits a degree of similarity to the bookmark eigenvalue for the bookmark data set generated by the user that is greater than a predetermined threshold degree of similarity.

According to some related embodiments of the present disclosure, a method for recommending bookmark data may include maintaining bookmark data created by a plurality of users in a database, assigning a URL eigenvalue to each of URLs included in the bookmark data maintained in the database based on a predetermined method of assigning URL eigenvalues, classifying the URL eigenvalues into a plurality of groups, assigning a group eigenvalue to each of the plurality of groups, receiving a plurality of URLs classified into one group from a first user, assigning a URL eigenvalue to each of the plurality of URLs provided by the first user based on the predetermined method of assigning URL eigenvalues, assigning an eigenvalue to the one group in consideration of the URL eigenvalue assigned to each of the plurality of URLs provided by the first user, selecting at least one group from among the plurality of groups in consideration of the eigenvalue assigned to the one group and the eigenvalue assigned to each of the plurality of groups, and recommending URLs belonging to the selected at least one group to the first user.

In some embodiments, the method may further include receiving a user memo that corresponds to the one group from the first user. The eigenvalue of the one group may be determined in further consideration of an eigenvalue for the user memo in addition to the URL eigenvalue assigned to each of the plurality of URLs provided by the first user. In some embodiments, the eigenvalue of the one group may be determined by imparting a higher weight to the eigenvalue for the user memo than to the URL eigenvalue assigned to each of the plurality of URLs.

According to the bookmark recommendation method and system of the present disclosure, by recommending already created bookmarks to users who want to find information about a specific field, the users can more easily access necessary information without wasting unnecessary time.

DETAILED DESCRIPTION

Figure 1:
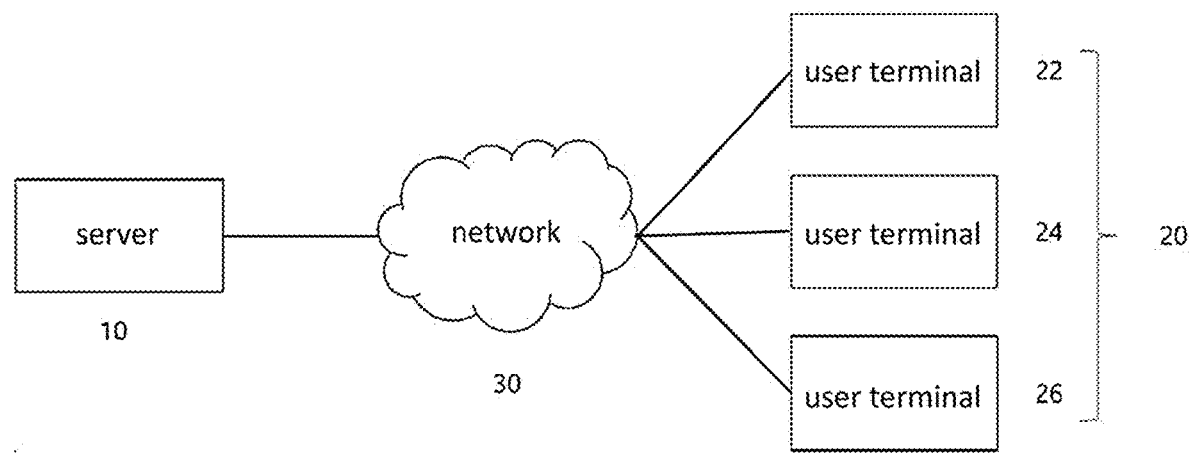
FIG. 1 schematically illustrates a bookmark recommendation system according to an embodiment of the present disclosure.

The above-mentioned objects, features and advantages of the present disclosure will become more apparent from the following detailed description in conjunction with the accompanying drawings. However, since the present disclosure may have various changes and may have various embodiments, specific embodiments will be exemplified in the drawings and described in detail below.

Throughout the specification, like reference numerals principally refer to like elements. In addition, components having the same function within the scope of the same idea shown in the drawings of each embodiment will be described using the same reference numerals, and overlapping descriptions thereof will be omitted.

When there is a concern that detailed description of a known function or configuration related to the present disclosure may unnecessarily obscure the gist of the present disclosure, the description thereof will be omitted. In addition, numbers (e.g., first, second, etc.) used in the present disclosure are merely identifiers for distinguishing one component from another.

In addition, the suffixes "module" and "part" for the components used in the following embodiments are given or mixed in consideration of only the ease of writing the specification, and do not have distinct meanings or roles by themselves.

In the following examples, the singular expression includes the plural expression as well unless the context clearly indicates otherwise.

In the following embodiments, terms such as "comprise" or "have" mean that the features or components described in the specification are present, and the possibility that one or more other features or components may be added is not precluded.

In the drawings, the size of the components may be exaggerated or reduced for convenience of description. For example, the size and thickness of each component shown in the drawings are arbitrarily indicated for convenience of description, and the present disclosure is not necessarily limited to the specific illustration.

In cases where certain embodiments are implementable in different ways, the order of specific processes may be performed differently from the order as they are described. For example, two processes described in succession may be performed substantially simultaneously, or may be performed in an order opposite to the order described.

In the following embodiments, when components are connected, it includes not only the cases in which components are directly connected, but also the cases in which components are indirectly connected via other components.

For example, in the present specification, when it is said that components and the like are electrically connected, it may include not only the case where the components are electrically connected directly, but also the case where the components are electrically connected indirectly with some components interposed therebetween.

According to some embodiments of the present disclosure, a bookmark recommendation method is provided. The bookmark recommendation method may include steps of receiving a bookmark data set from a user. Herein, the bookmark data set may include a main topic and a plurality of sub-topics, and each of the plurality of sub-topics may include a sub-title and a plurality of URLs. The method may further include assigning a bookmark eigenvalue to the bookmark data set based on a predetermined method. The step of assigning the bookmark eigenvalue to the bookmark data set may include assigning a sub-topic eigenvalue for each of the plurality of sub-topics. Further, the step of assigning the sub-topic eigenvalue to each of the plurality of sub-topics may include assigning a URL eigenvalue by analyzing, based on a predetermined algorithm, each of a plurality of web pages, each corresponding to each of the plurality of URLs included in each of the plurality of sub-topics; assigning a sub-title eigenvalue for the sub-title of the each of the plurality of sub-topics. Accordingly, the sub-topic eigenvalue may be determined in consideration of the URL eigenvalue and the sub-title eigenvalue. Further, the method may include determining, based on the bookmark eigenvalue, another bookmark data set that is similar to the bookmark data set generated by the user or another sub-topic that is similar to a sub-topic included in the bookmark data set generated by the user; and transmitting the determined another bookmark data set or another sub-topic to the user terminal.

In particular, the step of assigning the sub-topic eigenvalue may further include assigning an eigenvalue for a user memo that corresponds to at least one of the plurality of sub-topics, and the sub-topic eigenvalue may be determined considering the eigenvalue for the user memo in addition to the URL eigenvalue and the sub-title eigenvalue.

Meanwhile, when the sub-topic eigenvalue is determined, a higher weight may be imparted to the eigenvalue for the user memo than the URL eigenvalue or the sub-title eigenvalue.

The step of determining another bookmark data set that is similar to the bookmark data set generated by the user or another sub-topic that is similar to the sub-topic included in the bookmark data set generated by the user may include assigning an eigenvalue to each of bookmark data created by another user other than the user and bookmark data automatically created; and selecting at least a part of the bookmark data so created, which exhibits a degree of similarity to the bookmark eigenvalue for the bookmark data set generated by the user that is greater than a predetermined threshold degree of similarity.

According to some related embodiments of the present disclosure, a bookmark recommendation method is provided. The bookmark recommendation method may include maintaining bookmark data generated by a plurality of users in a database; assigning a URL eigenvalue to each of URLs included in the bookmark data maintained in the database based on a predetermined method of assigning URL eigenvalues; classifying the URL eigenvalues into a plurality of groups based on a predetermined classification criterion; assigning a group eigenvalue to each of the plurality of groups based on a predetermined method of assigning the group eigenvalues; receiving a plurality of URLs classified into one group from a first user; assigning a URL eigenvalue to each of the plurality of URLs provided by the first user based on the predetermined method of assigning URL eigenvalues; assigning an eigenvalue to the one group in consideration of the URL eigenvalue assigned to each of the plurality of URLs provided by the first user; selecting at least one group from among the plurality of groups in consideration of the eigenvalue assigned to the one group and the eigenvalue assigned to each of the plurality of groups; and recommending URLs belonging to the selected at least one group to the first user.

In particular, the method may further include receiving a user memo for the one group from the first user.

Further, when the eigenvalue is assigned to the one group, in addition to the URL eigenvalue assigned to each of the plurality of URLs provided by the first user, an eigenvalue assigned for the user memo may be further taken into consideration.

In addition, when the eigenvalue is assigned to the one group, a higher weight may be imparted to the eigenvalue assigned to the user memo than to the URL eigenvalue assigned to each of the plurality of URLs.

Referring to FIG. 1, a bookmark recommendation system according to an embodiment of the present disclosure will be described.

According to an embodiment of the present disclosure, a bookmark recommendation system 1 may be provided. The bookmark recommendation system 1 may include a server 10 and a plurality of user terminals 20 that are connected to the server 10. The server 10 may be connected to the user terminals 20 through a network 30.

The user terminals 20 may refer to electronic devices used by users to access the server 10 through the network 30 and capable of communication. By way of example, the user terminals 20 may include various types of electronic devices such as a PC, a smartphone, a tablet, a laptop computer, and the like.

A user may access the server 10 via the user terminals 20 and use a bookmark creation function and a bookmark recommendation function provided by the server 10. The user may access a website (web service) provided by the server 10 using various browsing applications installed in the user terminals 20, or the user may install a specific application that interworks with the service provided by the server 10 in the user terminal 20 and may execute the application to access the server 10.

Basically, as will become clearer from the description below, the server 10 may perform key functions such as creation of bookmark data, storage and maintenance of bookmark data, update of bookmark data, analysis of bookmark data, recommendation of bookmark data, and the like. The user terminals 20 may perform a function of receiving information necessary for creating a bookmark from a user and a function of outputting necessary information to the user audio visually.

First, various functions of the server 10 according to some embodiments of the present disclosure will be described.
1. Creation of Bookmark Data Based on User Input The server 10 may receive a user input from the user terminals 20 and may generate bookmark data for websites that the user may desire.
(1) Hierarchical Structure of Bookmark Data The server 10 may generate bookmark data that includes a hierarchical structure based on a user input.

The bookmark data may include, for example, one main topic, at least one sub-topic, and at least one URL data that corresponds to each of the at least one sub-topic.

Figure 2:
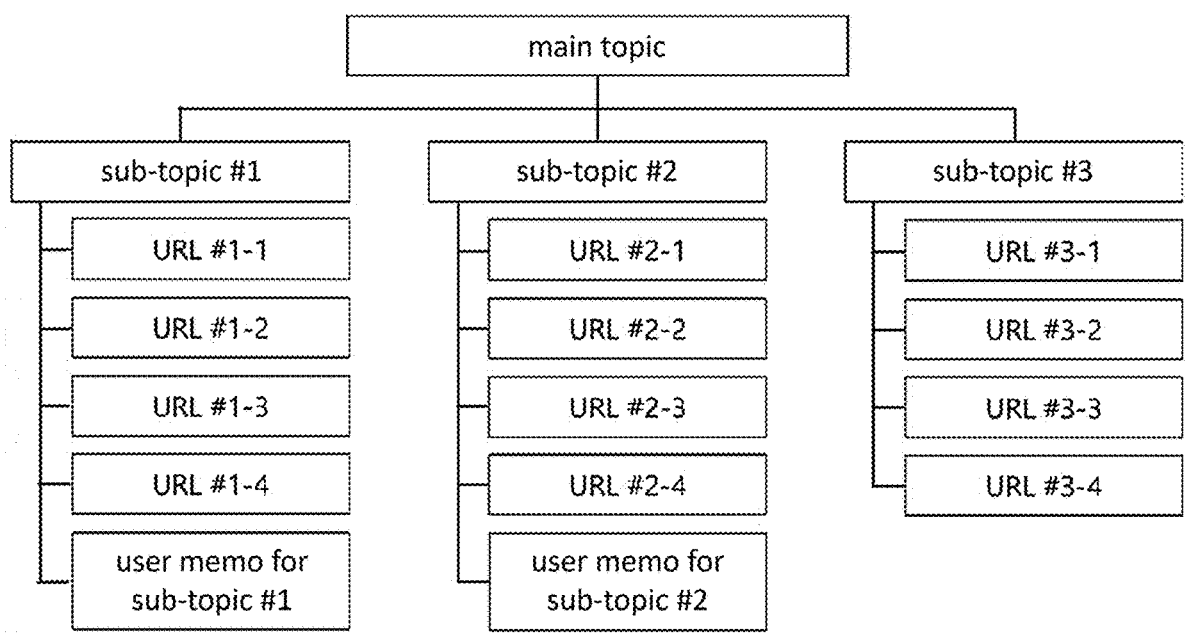
FIG. 2 shows an example of a structure of the bookmarks created according to an embodiment of the present disclosure.

For example, as shown in FIG. 2, one bookmark data may have one main topic, three sub-topics that belong to the one main topic, and a plurality of URLs mapped and stored for each of the three sub-topics.

The main topic may be interests upon which the user wants to collect information, and the main topic may be a title for bookmark data. For example, if the topic in which the user is interested is travel to Korea, the main topic may be set to "travel to Korea."

The sub-topic may be a topic related to a sub-category of interest for which the user wants to collect information, and the sub-topic may be a title for the sub-categories. For example, when the main topic in which the user is interested is "travel to Korea," one of the sub-topics may be "a place to visit in Korea," another of the sub-topics may be "traditional foods to taste during the travel to Korea," and yet another one of the sub-topics may be "Korean history and historical articles related thereto."

The URLs may be a uniform resource locator of a website searched by the user. Each of the URLs may correspond to one of the sub-topics.

The bookmark data may further include, for example, a user memo in addition to the main topic, the at least one sub-topic, and the plurality of URL data that correspond to each of the at least one sub-topic.

The user memo may be a user memo on the main topic.

Alternatively, the user memo may be a user memo for each of the sub-topics.

Alternatively, the user memo may be a user memo for each of the URLs.

Hereinbelow, the bookmark may also be referred to as bookmark data or a bookmark data set, etc., and the main topic may be referred to as a title of bookmark data or a bookmark data title. Further, the sub-topic may be referred to as a title of a sub-topic or a sub-title, and the user memo may be referred to as meta information or tag information.

The user memo may or may not be included in the bookmark data.

FIG. 2 illustrates bookmark data including a user memo for a sub-topic. Also, in the bookmark data illustrated in FIG. 2, sub-topic #1 and sub-topic #2 have user memos that correspond thereto, but sub-topic #3 does not include a corresponding user memo. The structure of the bookmark data shown in FIG. 2 is exemplary, and the bookmark data to be processed by the bookmark recommendation system according to the present disclosure may have various structures in addition to the exemplary structure shown in FIG. 2.
(2) User Interface The main topic, the sub-topic, and the URL may be input from the user through the user terminal 20.

As will be clearer through the following description, in the bookmark recommendation method and system according to the present disclosure, the hierarchical structure of bookmark data may be treated important.

Therefore, in order to implement the bookmark recommendation method according to the present disclosure, an appropriate user interface may need to be provided so that the bookmark data generated by a user input has such hierarchical structure.

Accordingly, the website provided by the server 10 may receive information on the main topic to which the URL belongs when the user stores the URL, and information associated with the main topic to which the URL belongs. Further, a user interface, through which information associated with the sub-topic to which the URL belongs is input, may be configured and provided to the user terminals 20.

Alternatively, the application installed in the user terminals 20 and operating in connection with the server 10 may configure a user interface for achieving the above-described object and may provide it to the user.

Although there may be a wide variety of methods for implementing the above-described user interface, any method that provides an interface for enabling one URL to correspond to at least one main topic or sub-topic may be used in order to generate the bookmark data having a hierarchical structure.

2. Analysis of Bookmark Data

The server 10 may analyze the bookmark data generated by the user. The purpose of analyzing the bookmark data is as follows:

First, by analyzing the main topic or sub-topic of the target bookmark data, the server 10 may infer information about the interests of the users.

Second, the bookmark data, main topic, sub-topic, or the like generated for similar interests among various interests of the users that have been inferred may be evaluated.

Hereinbelow, a method of analyzing bookmark data according to some embodiments of the present disclosure will be described.

(1) Analysis of Website Corresponding to Each URL

The server 10 may analyze a plurality of web pages that correspond to a plurality of URLs included in the bookmark data.

For example, the server 10 may access a bookmarked web page (or website) using the URL, obtain text information included in the web page, and analyze the text information.

In order to analyze the text information included in the web page, the server 10 may derive a keyword for the web page. In order to derive the keyword, various factors and variables including the frequency of words in the web page may be considered. In order to derive the keyword from the web page, a conventional text-based keyword derivation algorithm may be utilized.

In order to analyze the text information included in the web page, the server 10 may assign eigenvalues to the derived keywords. Methods for assigning the eigenvalues to the keywords may be diverse, and an example of such methods is a "word2vec" algorithm. Herein, the term "eigenvalue" may refer to a unique numeric value or a unique set of numeric values, e.g., in a vector space, that is uniquely assigned to or evaluated for a word, a phrase, or a sentence. By way of example, the eigenvalues may be defined in a multi-dimensional vector space.

The server 10 may use a plurality of keywords derived from one web page and an eigenvalue or vector that corresponds to each of the keywords (hereinbelow referred to as a keyword eigenvalue) to calculate an eigenvalue for the web page, and may associate the calculated eigenvalue (hereinbelow referred to as a web page eigenvalue or a URL eigenvalue) to the web page. In other words, the server 10 may assign the eigenvalue calculated by the aforementioned method to one of the plurality of URLs included in the bookmark data.

In order to analyze one set of bookmark data, the server 10 may assign eigenvalues to all of the URLs included in the bookmark data to be analyzed.

When there is a user memo that corresponds to the URL, the server 10 may assign an eigenvalue to the user memo via keyword extraction and/or eigenvalue assignment. The assigned eigenvalue may be used in calculating the URL eigenvalue.

In summary, when there is a user memo that corresponds to the URL, the server 10 may calculate the URL eigenvalue based on the eigenvalue assigned to the user memo and the eigenvalues assigned to the keywords of the web page. In some embodiments, the server 10 may impart a higher weight to the eigenvalue assigned to the user memo. The reason for imparting a higher weight to the eigenvalue assigned to the user memo is as follows.

As described above, one of the purposes of analyzing the bookmark data generated by the user is to infer the intention of the user who is generating the corresponding bookmark data. Although it may be inferred that the keywords in the web page that corresponds to the URL bookmarked by the user contain the information that the user wants to obtain, the web page itself has been generated by someone other than the user. However, since the user memo about the URL is directly generated by the user about the web page, the content in the user memo may have a more important meaning in inferring the user's intention. It is not always necessary to impart a higher weight to the user memo, however.

(2) Analysis of Sub-topic

The server 10 may analyze the sub-topic included in the bookmark data.

For example, the server 10 may analyze the sub-topic in consideration of web pages that correspond to a plurality of URLs grouped into one sub-topic by the user.

In order to analyze the sub-topic, the server 10 may use the URL eigenvalue analyzed as described above. For example, in order to assign an eigenvalue to the sub-topic, the server 10 may use the plurality of URL eigenvalues, each corresponding to each of the plurality of URLs included in the sub-topic. As a more specific example, the server 10 may calculate an arithmetic average of the plurality of eigenvalues assigned to the plurality of URLs, and use the calculated arithmetic average to calculate the sub-topic eigenvalue. To this end, the eigenvalues assigned to the plurality of URLs may be configured to have the same dimension.

In order to analyze the sub-topic, the server 10 may assign an eigenvalue to the title of the sub-topic (sub-title) through the above-described keyword extraction and/or eigenvalue assignment, or the like, and the eigenvalue assigned to the sub-title may be used when calculating the sub-topic eigenvalue.

When there is a user memo that corresponds to the sub-topic, the server 10 may assign an eigenvalue to the user memo through keyword extraction and/or eigenvalue assignment. The eigenvalue assigned to the user memo may be used when calculating the sub-topic eigenvalue.

In summary, when there is a user memo that corresponds to the sub-topic, the server 10 may evaluate the sub-topic eigenvalue, based on one or more of the eigenvalue assigned to the user memo, the eigenvalues assigned to the URLs, or the eigenvalue assigned to the title of the sub-topic. In some embodiments, the server 10 may impart a higher weight to the eigenvalue assigned to the user memo. The reason for imparting a higher weight to the eigenvalue assigned to the user memo is similar to the reason for imparting a higher weight to the user memo when calculating the URL eigenvalue. In addition, it is not always necessary to impart a higher weight to the user memo.

(3) Analysis of Main Topic

The server 10 may analyze the main topic of the bookmark data.

For example, the server 10 may analyze the main topic in consideration of a plurality of sub-topics grouped as one main topic by the user.

In order to analyze the main topic, the server 10 may use the sub-topic eigenvalues analyzed as described above. For example, in order to assign an eigenvalue to the main topic, the server 10 may use the sub-topic eigenvalue assigned to the sub-topic. As a more specific example, the server 10 may calculate an arithmetic average of the plurality of sub-topic eigenvalues assigned to the plurality of sub-topics, and use the calculated arithmetic average to calculate the main topic eigenvalue. To this end, the eigenvalues assigned to the plurality of sub-topics may be configured to have the same dimension.

In order to analyze the main topic, the server 10 may assign an eigenvalue to the title of the main topic (main title) through the above-described methods such as keyword extraction and/or eigenvalue assignment, and the eigenvalue assigned to the main title may be used when calculating the main topic eigenvalue.

If there is a user memo that corresponds to the main topic, the server 10 may assign an eigenvalue to the user memo through keyword extraction and/or eigenvalue assignment, and the eigenvalue assigned to the user memo may be used when calculating the main topic eigenvalue.

In summary, when there is a user memo that corresponds to the main topic, the server 10 may evaluate the main topic eigenvalue, based on one or more of the eigenvalue assigned to the user memo, eigenvalues assigned to the sub-topics, or the eigenvalue assigned to the title of the main topic. In some embodiments, the server 10 may impart a higher weight to the eigenvalue assigned to the user memo. The reason for imparting a higher weight to the eigenvalue assigned to the user memo is similar as described above. In addition, it is not always necessary to impart a higher weight to the user memo.

Figure 3:
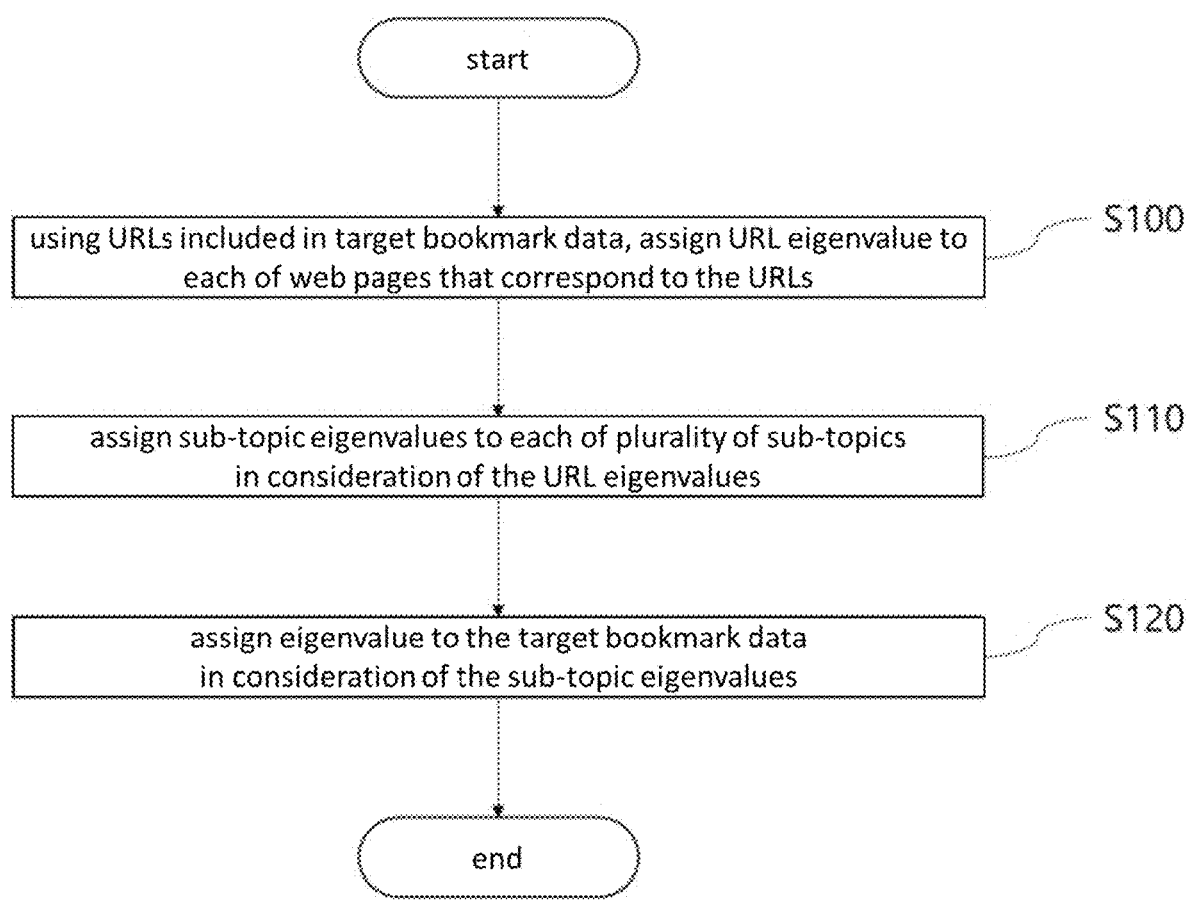
FIG. 3 schematically illustrates a method of analyzing bookmark data according to an embodiment of the present disclosure.

Referring to FIG. 3, the analysis method of the bookmark data according to the present disclosure may be summarized as follows.

Using the URLs included in the target bookmark data, the server 10 may assign a URL eigenvalue to each of the web pages that correspond to the URLs (S100).

The server 10 may assign an eigenvalue to each of the plurality of sub-topics in consideration of the URL eigenvalues (S110). Since the method of assigning an eigenvalue to each URL has already been described in detail, a detailed description thereof will be omitted here.

As described above, the server 10 may identify the URLs grouped by one sub-topic and assign an eigenvalue to each sub-topic, and may assign an eigenvalue to each of the sub-topics using the URL eigenvalues assigned to the identified URLs. A detailed description will be omitted here.

Subsequently, the server 10 may assign an eigenvalue to the target bookmark data (main topic) in consideration of the sub-topic eigenvalues (S120).

That is, the method for analyzing bookmark data according to the present disclosure may include the steps of assigning URL eigenvalues to the web pages that correspond to the URLs using the URLs included in the target bookmark data (S100), assigning sub-topic eigenvalues to the plurality of sub-topics in consideration of the URL eigenvalues (S110), and assigning an eigenvalue to the target bookmark data (main topic) in consideration of the sub-topic eigenvalues (S120).

3. Automatic Creation of Bookmark Data by Server

The server 10 may automatically generate bookmark data different from the already created bookmark data and/or generate sub-topics different from the already created sub-topics, by using the URL eigenvalues analyzed as described above. To this end, the server 10 may utilize all URL eigenvalues included in all bookmarks created by the server 10, rather than using only the URL eigenvalues included in the bookmarks created by a specific user.

In other words, the server 10 may analyze bookmark data generated by a plurality of users, and collect and analyze the URL information collected from the plurality of users who are interested in a similar topic.

For example, when the eigenvalues assigned to the URLs are N-dimension vectors, each of the URLs bookmarked by a plurality of users may be mathematically mapped to a single point in an N-dimensional space. The plurality of URLs expressed in the dimensional space may be grouped into a plurality of groups by using various classification algorithms or grouping algorithms. In such case, the mathematical distance between two URLs belonging to the same group may be shorter than the mathematical distance between two URLs belonging to different groups.

However, criterion of the mathematical distance for grouping into the same group may be set differently as needed.

For example, if the criterion for grouping into the same group is set as a first criterion, the URLs included in the same group may include URLs related to "travel to Korea." On the other hand, if the grouping criterion is set to a second criterion that is smaller than the first criterion (for example, the mathematical distance is set to be shorter), the URLs included in the same group may include URLs related to "historical sites to visit while traveling to Korea."

Referring to FIGS. 4-7, an example of automatically generating a sub-topic using URLs bookmarked by a plurality of users will be described.

Figure 4:
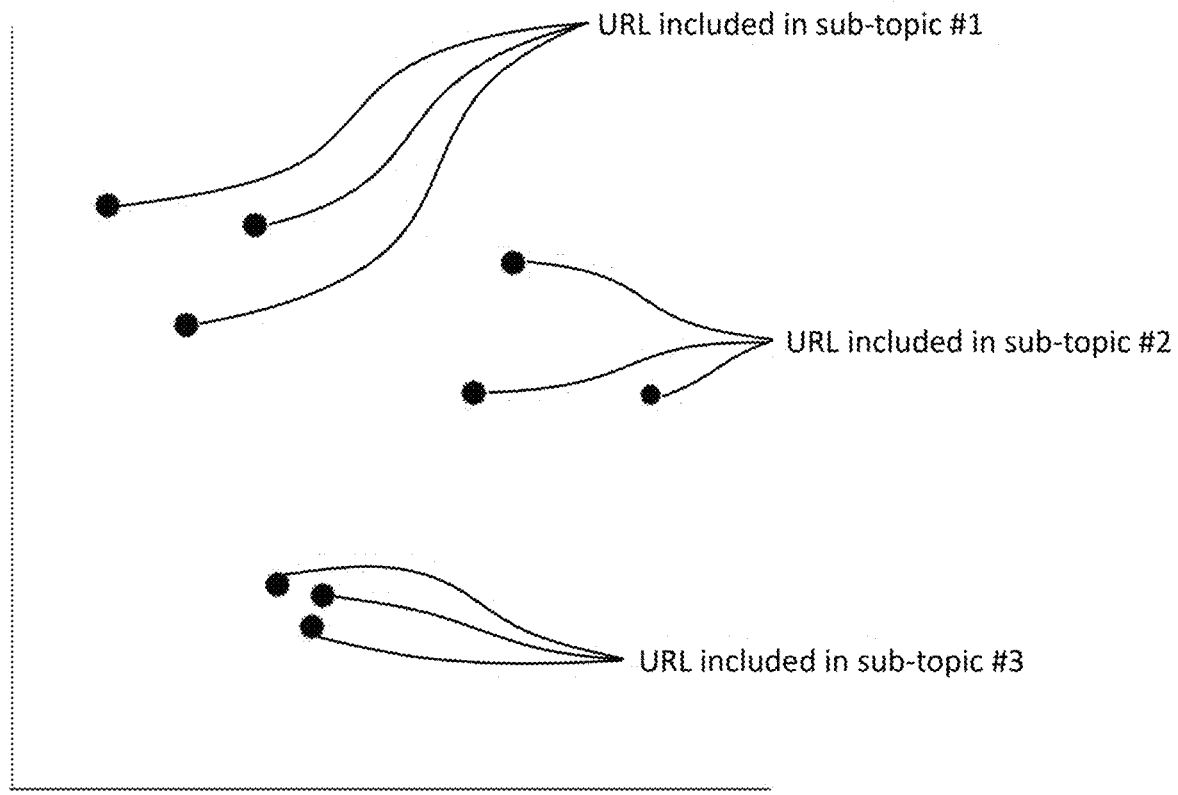
FIGS. 4-7 explain automatically generating a sub-topic using URLs bookmarked by a plurality of users according to an embodiment of the present disclosure.
Figure 5:
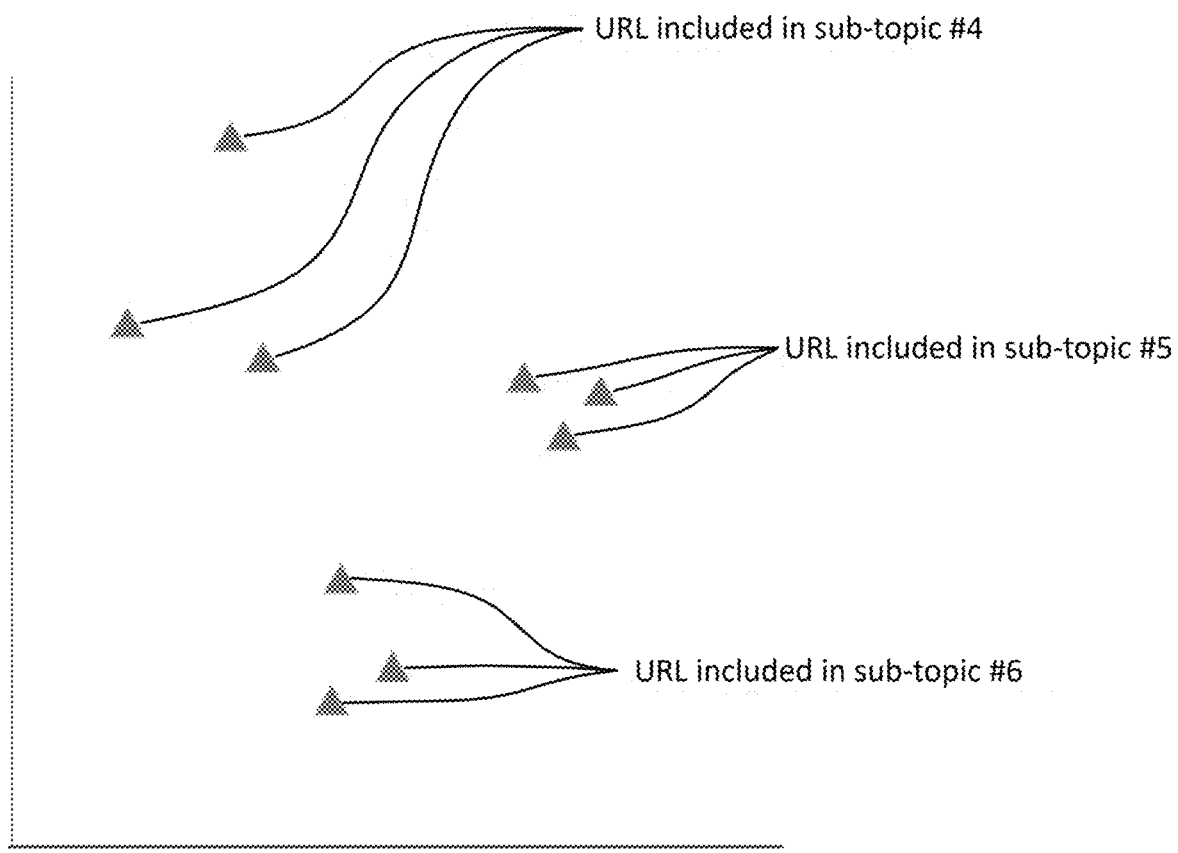

FIG. 4 depicts a first bookmark data created by a first user, including URLs to nine web pages, in which the main topic of "travel to Korea" is grouped into a first sub-topic, a second sub-topic, and a third sub-topic. FIG. 5 depicts a second bookmark data created by a second user, including URLs to nine web pages, in which the main topic of "travel to Korea" is grouped into a fourth sub-topic, a fifth sub-topic, and a sixth sub-topic.

Although, in reality, a URL eigenvalue would be a high-dimensional vector with 100 or more dimensions, for convenience of explanation, we will assume that the URL eigenvalues may be expressed as two-dimensional vectors. Under such an assumption, FIGS. 4 and 5 show the points that correspond to URL eigenvalues (URL vector values).

Figure 6:
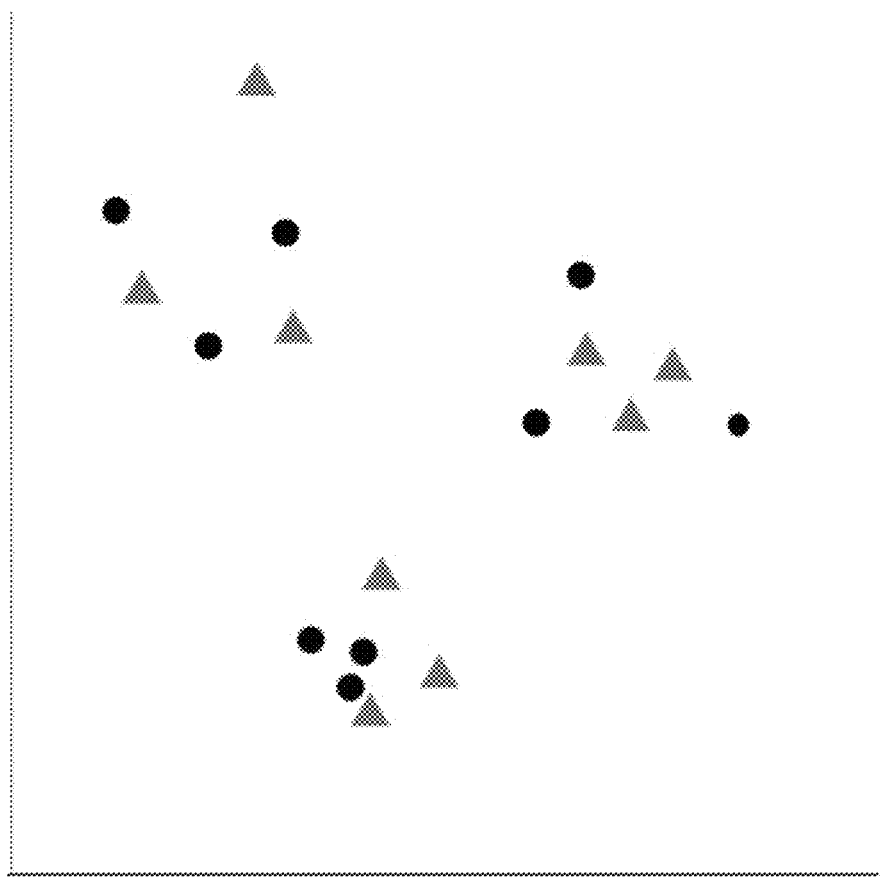

FIG. 6 combines the first bookmark (created by the first user) shown in FIG. 4 and the second bookmark (created by the second user) shown in FIG. 5 in one space (vector space).

Figure 7:
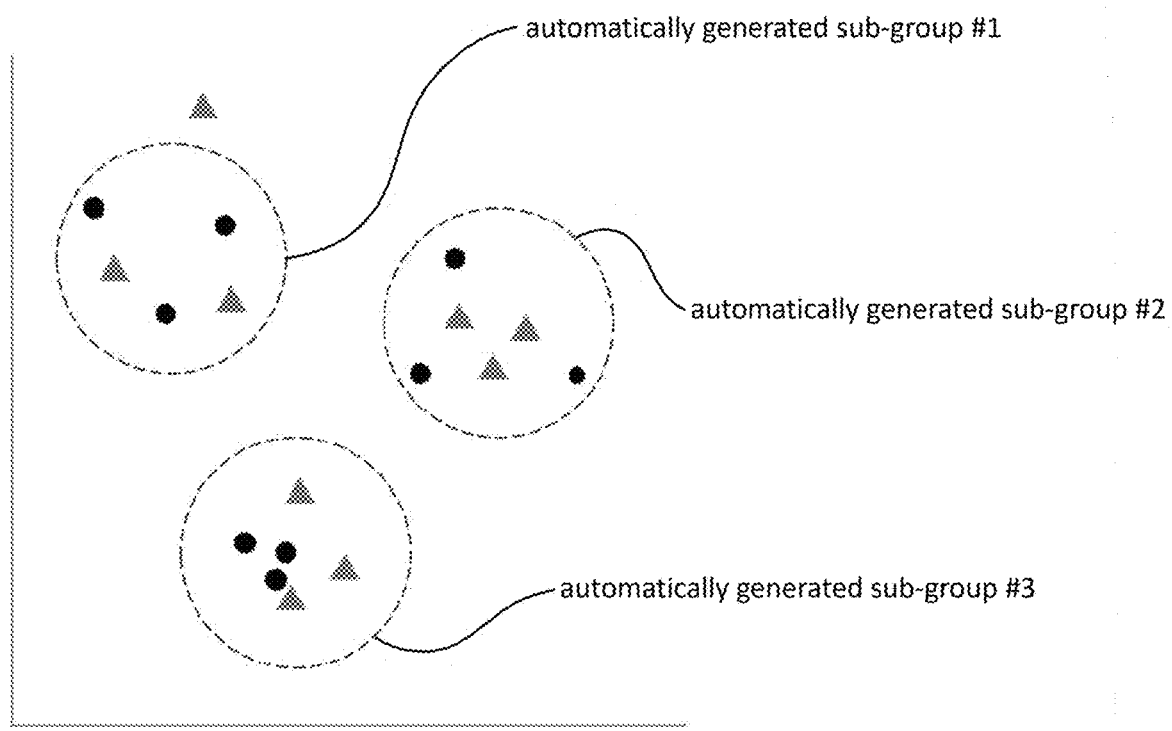

The server 10 may automatically group the URLs expressed in the vector space as shown in FIG. 6 using various algorithms. For example, the server 10 may automatically group the 18 URLs into three groups, as shown in FIG. 7.

The automatically generated first sub-group includes all three URLs grouped by the first user as the first sub-topic, and two of the three URLs grouped by the second user as the fourth sub-topic. In addition, the automatically generated second sub-group includes all three URLs grouped by the first user as the second sub-topic and the three URLs grouped by the second user as the fifth sub-topic. The automatically generated third sub-group includes all three URLs grouped by the first user as the third sub-topic and all three URLs grouped by the second user as the sixth sub-topic.

As a result, it can be seen that the sub-topics (sub-groups) automatically generated by the server 10 as described above may be different from the sub-topics created by the first user and also different from the sub-topics created by the second user. Furthermore, it can be seen that the sub-topics automatically generated by the server 10 may include more information than information included in the sub-topics generated by each user.

4. Recommendation of Bookmark Data

The server 10 may recommend, to a particular user who is creating the bookmark data, bookmark data or a sub-topic of the bookmark data that is highly related to the bookmark data that the user is creating.

(1) Evaluation of Degree of Similarity

The server 10 may select bookmark data similar to the target bookmark data created by the user.

The server 10 may calculate a degree of similarity (e.g., a level of similarity) between bookmark data in order to select other bookmark data similar to the bookmark data. For example, the server 10 may calculate the degree of similarity based on the mathematical distances between the eigenvalue (vector value) assigned to the target bookmark data created by the user and the eigenvalues (vector values) assigned to a plurality of other bookmarks. More specifically, the closer the mathematical distance between the first bookmark data and the second bookmark data, the higher the degree of similarity may be between the two bookmarks.

The server 10 may select a sub-topic similar to the sub-topic included in the target bookmark data created by the user.

The server 10 may calculate a degree of similarity between the sub-topics in order to select other sub-topics similar to the sub-topics. For example, the server 10 may calculate mathematical distances between the eigenvalue (vector value) assigned to the sub-topic created by the user and eigenvalues (vector values) assigned to a plurality of other sub-topics. More specifically, the closer the mathematical distance between the first sub-topic and the second sub-topic, the higher the degree of similarity may be between the two sub-topics.

(2) Recommendation of Bookmark Data Created by Other Users

The server 10 may select at least one bookmark data from among the bookmark data created by other users in consideration of the eigenvalue assigned to the bookmark data generated by a particular user, and the selected at least one bookmark data may be recommended to the user.

In order to select one or more bookmark data from among the bookmark data created by other users, the server 10 may consider the degree of similarity between the bookmark data created by the user and the bookmark data created by other users.

For example, the server 10 may select and recommend, to the user, bookmark data having a degree of similarity with the bookmark data generated by the user that is equal to or greater than a predetermined threshold degree of similarity.

The bookmark data to be recommended to the user may be one or more, and when a plurality of bookmark data are recommended, bookmark data having a higher degree of similarity and a lower degree of similarity may be distinguished from each other and be provided to the user accordingly.

For example, when outputting a plurality of bookmark data recommended by the server 10 to the user, the user terminal 20 of the user may sort and display the bookmark data in a descending or ascending order according to the degree of similarity.

(3) Recommendation of Sub-topics Created by Other Users

The server 10 may select at least one sub-topic among the sub-topics included in the bookmark data created by other users in consideration of eigenvalues assigned to the sub-topics included in the bookmark data that a particular user is creating, and then may recommend the selected at least one sub-topic to the user.

In order to select one or more recommended sub-topics from among the sub-topics generated by other users, the server 10 may consider the degree of similarity between the sub-topic created by the user and the sub-topics created by other users.

For example, the server 10 may select sub-topics that have a degree of similarity to the sub-topic created by the user that is equal to or greater than a predetermined threshold degree of similarity and recommend them to the user.

The sub-topic to be recommended to the user may be one or more, and when a plurality of sub-topics are recommended, sub-topics having a higher degree of similarity and a lower degree of similarity may be distinguished from each other and be provided to the user accordingly.

(4) Recommendation of Automatically Generated Bookmark Data

The server 10 may select at least one bookmark data from among the bookmark data automatically generated by the server 10 in consideration of the eigenvalue assigned to the bookmark data being generated by a particular user, and then recommend the selected at least one bookmark data to the user.

Since the method of selecting one or more bookmark data from among the bookmark data automatically generated by the server 10 is similar to the above-described method of selecting bookmark data generated by other users, a detailed description will be omitted.

(5) Recommendation of Automatically Generated Sub-topics

The server 10 may select at least one sub-topic from among the sub-topics automatically generated by the server 10 in consideration of an eigenvalue assigned to a sub-topic being created by a particular user, and then recommend the selected at least one sub-topic to the user.

Since the method of selecting one or more sub-topics from among the bookmark data automatically generated by the server 10 is similar to the above-described method of selecting sub-topics generated by other users, a detailed description thereof will be omitted.

(6) Others

Mixed Recommendation—When the server 10 recommends bookmark data and/or sub-topic to the user, bookmark data and/or sub-topics generated by other users and bookmark data and/or sub-topics automatically generated by the server 10 may be mixed and recommended to the user.

Whole/Partial Recommendation—When recommending bookmark data to the user, the server 10 may recommend bookmark data generated automatically and/or by other users in its entirety or may recommend only a part of the bookmark data. More specifically, the server 10 may recommend all of the sub-topics included in the bookmark data created by other users to the user, or may provide some of the sub-topics included in the bookmark data created by other users to the user. When selecting a part of the sub-topics, a degree of similarity between the sub-topics generated by the user and the sub-topics generated by other users may be considered.

Hereinabove, a method for recommending bookmark data according to the present disclosure has been described.

Although not shown in detail in the drawings, the server 10 may include a communication unit capable of communicating with the user terminals 20 through the network 30, a processor configured to perform the above-described methods, and a storage (e.g., memory) for storing program instructions for performing the above-described methods and/or the bookmark data created automatically and/or by the users.

What is claimed is:

1. A method for recommending bookmark data, comprising:

receiving a bookmark data set from a user terminal of a user, wherein the bookmark data set includes a main topic and a plurality of sub-topics, and wherein each of the plurality of sub-topics includes a sub-title and a plurality of URLs;

assigning a bookmark eigenvalue for the bookmark data set based on a predetermined method, which comprises assigning a sub-topic eigenvalue for each of the plurality of sub-topics, which comprises:

assigning a URL eigenvalue for each of the plurality of URLs included in each of the plurality of sub-topics by analyzing a plurality of web pages that correspond to the plurality of URLs; and assigning a sub-title eigenvalue for the sub-title of the each of the plurality of sub-topics, wherein the sub-topic eigenvalue is determined in consideration of the URL eigenvalue and the sub-title eigenvalue;

determining, based on the bookmark eigenvalue, another bookmark data set that is similar to the bookmark data set or another sub-topic that is similar to a sub-topic included in the bookmark data set; and transmitting the another bookmark data set or the another sub-topic to the user terminal.

2. The method of claim 1, wherein the step of assigning the sub-topic eigenvalue comprises assigning an eigenvalue for a user memo that corresponds to at least one of the plurality of sub-topics, and wherein the sub-topic eigenvalue is determined by further considering the eigenvalue for the user memo in addition to the URL eigenvalue and the sub-title eigenvalue.

3. The method of claim 2, wherein the sub-topic eigenvalue is determined by imparting a higher weight to the eigenvalue for the user memo than the URL eigenvalue and the sub-title eigenvalue.

4. The method of claim 1, wherein the step of determining the another bookmark data set or the another sub-topic comprises:

assigning an eigenvalue to each of bookmark data generated automatically or by another user other than the user; and selecting at least a part of the bookmark data generated automatically or by another user, which exhibits a degree of similarity to the bookmark eigenvalue for the bookmark data set generated by the user that is greater than a predetermined threshold degree of similarity.

5. A method for recommending bookmark data, comprising:

maintaining bookmark data created by a plurality of users in a database;

assigning a URL eigenvalue to each of URLs included in the bookmark data maintained in the database based on a predetermined method of assigning URL eigenvalues;

classifying the URL eigenvalues into a plurality of groups;

assigning a group eigenvalue to each of the plurality of groups;

receiving a plurality of URLs classified into one group from a first user;

assigning a URL eigenvalue to each of the plurality of URLs provided by the first user based on the predetermined method of assigning URL eigenvalues;

assigning an eigenvalue to the one group in consideration of the URL eigenvalue assigned to each of the plurality of URLs provided by the first user;

selecting at least one group from among the plurality of groups in consideration of the eigenvalue assigned to the one group and the eigenvalue assigned to each of the plurality of groups; and recommending URLs belonging to the selected at least one group to the first user.

6. The method of claim 5, further comprising:

receiving a user memo that corresponds to the one group from the first user.

7. The method of claim 6, wherein the eigenvalue of the one group is determined in further consideration of an eigenvalue for the user memo in addition to the URL eigenvalue assigned to each of the plurality of URLs provided by the first user.

8. The method of claim 7, wherein the eigenvalue of the one group is determined by imparting a higher weight to the eigenvalue for the user memo than to the URL eigenvalue assigned to each of the plurality of URLs.

* * * * *